United States Patent [19]

Penczynski et al.

[11] 3,989,885

[45] Nov. 2, 1976

[54] SUPPORT BODY FOR THE CONDUCTORS OF A LOW-TEMPERATURE CABLE

[75] Inventors: Peter Penczynski, Erlangen; Günther Matthäus, Spardorf; Peter Massek, Forchheim, all of Germany

[73] Assignee: Siemens Aktiengesellschaft, Munich, Germany

[22] Filed: May 21, 1975

[21] Appl. No.: 579,543

[30] Foreign Application Priority Data

May 31, 1974 Germany.............................. 2426422

[52] U.S. Cl.............................. 174/15 S; 174/130
[51] Int. Cl.²...................... H01B 12/00; H01B 7/34
[58] Field of Search............... 174/15 S, 15 C, 15 R, 174/12 R, 28, 99 B, 131 R, 130

[56] References Cited

UNITED STATES PATENTS

| | | | |
|---|---|---|---|
| 3,634,597 | 1/1972 | Ziemek et al...................... | 174/15 S |
| 3,691,287 | 9/1972 | Falke................................. | 174/15 S |
| 3,730,966 | 5/1973 | Aupoix et al...................... | 174/15 S |
| 3,749,811 | 7/1973 | Bogner et al...................... | 174/15 S |
| 3,823,248 | 7/1974 | Christie et al...................... | 174/99 B |
| 3,864,508 | 2/1975 | Beck................................. | 174/131 R |

*Primary Examiner*—Arthur T. Grimley
*Attorney, Agent, or Firm*—Kenyon & Kenyon Reilly Carr & Chapin

[57] ABSTRACT

A support body comprising several support elements lined up one behind the other is disclosed. More particularly, each support element includes a structure which is formed by support rings connected together by bridge members and which is provided at one end with extensions which can engage or be pushed into the end or last support ring of a preceding support element. Moreover, each support element is provided with additional means for limiting the degree of sliding-apart of the element from the element to which it is connected. The present support body has the advantage that its support elements as well as the connections between such elements are sufficiently mechanically stable so that no special guides for the support elements are necessary when the former are being wrapped.

13 Claims, 3 Drawing Figures

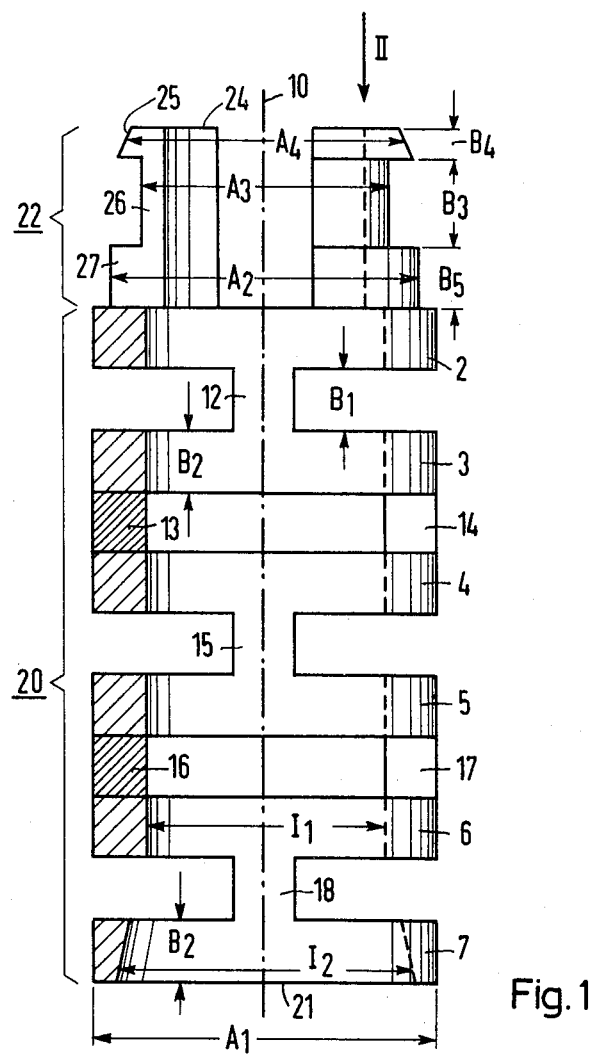
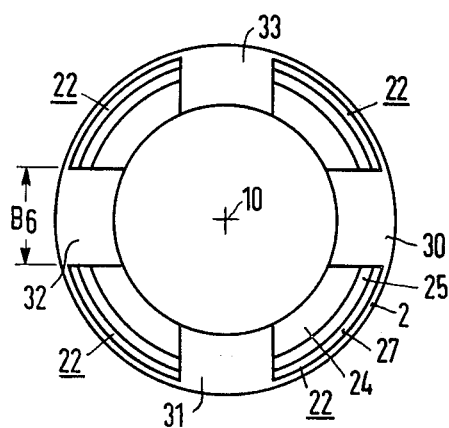

SUPPORT BODY FOR THE CONDUCTORS OF A LOW-TEMPERATURE CABLE

BACKGROUND OF THE INVENTION

1. Field of the Invention

The invention concerns a support body comprising several support elements which are lined up one behind the other in the direction of the axis of the low-temperature cable being supported. More particularly, the invention concerns a support body whose elements comprise support rings which enclose the cable axis, are arranged one behind the other at predetermined spacings and receive layers of individual conductors, particularly superconductors in wire or ribbon form, which are concentric with respect to the cable axis.

2. Description of the Prior Art

D-c and also three-phase cables, whose conductors are cooled to low temperatures and are, for instance, superconducting, can advantageously be made flexible, so that they can be wound on cable drums and can easily be installed in the field. The conductors of these cables typically comprise one or more layers of individual conductor wires or ribbons such as, for instance, individual aluminum wires which are coated on their outer surface with a superconducting layer. These layers of conductor wires or ribbons are, in general, arranged on the outer circumference of support bodies and, in addition, are often twisted so that the length of the cable is independent of temperature and, thus, remains constant when the cable is cooled down to a low temperature (U.S. Pat No. 3,541,221).

In the U.S. Pat. No. 3,668,297, a flexible low-temperature cable is disclosed whose tubular conductor comprises individual helical conductors. The individual conductors are each of an approximately rectangular cross section and are arranged at a mutual spacing on the outer circumference of a plastic support body. The latter support body comprises either support rings which may, additionally, be held against each other by means of wires, or a support helix which may include a wide helix of plastic upon which an additional narrow helix is placed.

A further support arrangement is known from the U.S. Pat. No. 3,691,287. This support arrangement contains several support rings which, together with an armor of foil or ribbon, are combined to form a hose-like structure capable of supporting a load. The support rings may, additionally, be loosely connected with each other by rods.

To fabricate a low-temperature cable with ring or helix type support elements, rigid guides are necessary, if the individual ribbon or wire conductors are to be applied to the outer surfaces of these support elements. As the required guidance must be carried out in the available cabling machines over long distances of, for instance, 20 m, difficulties are encountered in winding the support bodies formed from such support elements. These difficulties involve the use in the cabling machines of additional means for preventing the elongation or compression of the helical support elements or the axial displacement of the ring support elements.

There is also a danger that in a cable formed with support bodies comprised of helical or ring-type support elements the elements may become displaced as a result of temperature gradients which occur in the cooling-down and heating-up processes. The resultant diameter changes occurring in the case of the helical support elements, as well as the spacing changes occurring in the case of the support ring elements, cause the individual conductors supported by these elements to be less well secured. As a result there is a danger of conductor motion and thereby, a danger that individual conductor sections will become normal-conducting.

It is therefore an object of the present invention to improve the design of support elements of the type disclosed in the U.S. Pat. No. 3,691,287. In particular, a support element is to be provided which exhibits satisfactory mechanical stability, while still being sufficiently flexible and transparent for a coolant.

SUMMARY OF THE INVENTION

In accordance with the present invention, a support body is provided in which each support element of the body comprises at least two support rings which are rigidly connected with each other by bridges arranged parallel to the cable axis. Additionally, each support element is further provided at one end with at least one extension over which the end of a preceding support element can be pushed. Moreover, each element is also provided with means for limiting the degree of sliding-apart of the support element from the support element connected at its respective extension.

One advantage obtained with the support body of the present invention is that the body is, to a sufficient degree, transparent for a coolant. Furthermore, the support body can be designed so that it is flexible in the angular and lateral directions. In particular, such flexibility can be achieved by staggering in gimbal-fashion the connecting bridges connecting consecutive pairs of support rings of each support element. Such connection of the individual support rings of each element as well as the connection of the support elements with each other is found to be sufficiently mechanically stable so that no further means are required for guiding the support elements when applying the individual conductors in ribbon or wire form in cabling machines. When wrapping the support bodies composed of support elements arranged one behind the other, it is advisable that these support elements are pushed together on the extensions up to the stop located thereon.

In a further aspect of the invention, each support element is provided with several extensions which are parts of an annular body of rotation and are separated from each other by slots. These extensions are, preferably, provided at their respective free ends or front portions with a front piece which has the shape of a barb, the outside surfaces of these front pieces being situated on a common outer surface whose diameter is at least in part larger than the minimum inside diameter of the last support ring at the free end of the support element. These front pieces of the extensions, advantageously, prevent their respection support element from sliding apart from the preceding element.

According to still another aspect of the invention, the aforesaid extensions of each support element comprise respective intermediate sections between their front pieces and the structure formed of the support rings and bridges, the outside surfaces of these intermediate sections being situated on a common cylindrical surface whose diameter is at most equal to the minimum inside diameter of the last support ring at the free end of the support element and whose width is larger than the corresponding width of this last support ring. With this design of the extensions, play at the connecting junctions between individual support elements can be set in a predetermined way. In particular, the play can preferably be made so large that the thermal contraction during the cooling-down of a low-temperature cable is taken up by the support elements.

BRIEF DESCRIPTION OF THE DRAWING

A more detailed understanding of the invention can be obtained from the following detailed description which makes reference to the accompanying drawings, in which:

FIG. 1 shows, in partial cross section, a support element of a support body in accordance with the principles of the present invention;

FIG. 2 shows a top view onto the end surface of the support element of FIG. 1.

DETAILED DESCRIPTION

Figure 3:
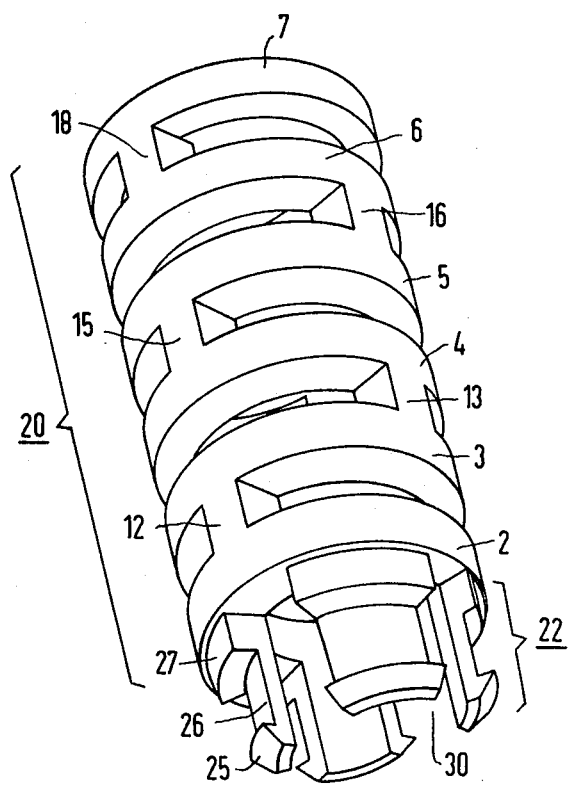
FIG. 3 illustrates a perspective view of the support element of FIG. 1.

A support body in accordance with the present invention is comprised of several support elements which are lined up one behind the other and which are each configured similarly to the support element illustrated in detail in FIG. 1. Typically, the support body is wrapped with individual ribbon or wire conductors which contain a normal-conducting metal and comprise, for instance, aluminum, on which a superconductive layer, e.g., niobium, has been applied.

As shown in FIG. 1, the hollow support element includes six support rings 2 to 7 which are arranged one behind the other and which are at predetermined equal spacings $B_1$. Each of the support rings has a width $B_2$, an outside diameter $A_1$, and each concentrically enclose an axis 10. Moreover, the rings 2 to 7 are rigidly connected with each other via connecting bridges 12 to 18. Specifically, a pair of diametrically opposed connecting bridges disposed parallel to the axis 10 are arranged between each pair of adjacent support rings. Adjacent pairs of bridges connecting consecutive pairs of adjacent rings are additionally displaced from each other in gimbal-fashion, i.e., displaced in the circumferential direction of the support element. Thus, the diametrically opposed bridges 13 and 14 connecting the adjacent pair of support rings 3 and 4 are displaced 90° relative to the bridges 15 connecting the support rings 4 and 5. As can be appreciated, since FIG. 1 is a cross section in the common plane of the bridges 13, 14, 16 and 17, only one bridge of the bridge pair 15, and, likewise, the bridge pairs 12 and 18, respectively, is visible in the figure.

The structure 20 formed by the support rings 2 to 7 and the connecting bridges 12 to 18 may be formed, for instance, from a hollow cylinder with the outside diameter $A_1$ and the inside diameter $I_1$, by cutting parts of the width $B_1$ from the cylinder so that only the support rings and the bridges remain.

While the outside and inside diameters of the support rings 2 to 6 are equal, the inside diameter $I_2$ of the outer or last support ring 7, which ring constitutes the one free end 21 of the support element, is larger than that of the other support rings. Additionally, the inside diameter $I_2$ of the support ring 7 increases when moving in a direction away from the adjacent support ring 6, i.e. the inside surface of the ring 7 is conical so as to flare toward the outside. Thus, as shown in FIG. 1, a trapezoidal cross section area results between the inner and the outer surface of the support ring 7.

At the end of the structure 20 opposite the free end 21, i.e., at the first support ring 2, several extensions or members 22 are attached in shoe-fashion. These extensions can be formed for instance, by cutting slots in a suitable tubular body from the free end face 24 down to the support ring 2. In the present support element the location of the slots defining the extensions 22 can be more clearly seen from FIGS. 2 and 3.

Each of the extensions 22 comprises three parts as viewed in the direction of the axis 10 from the end face 24. In particular, each extension includes a front piece 25, an intermediate section 26 and a spacing section 27. The spacing sections 27 serve to connect their respective extensions 22 to the support ring 2 and each has a width $B_5$ which is approximately equal to the width of each of the support rings 2 to 7. The outside surfaces of these extensions, moreover, lie on a common cylindrical surface whose diameter $A_2$ is somewhat smaller than the outside diameter $A_1$ of the first support ring 2, so that access of a coolant to the individual conductors attached at the support element is facilitated, and whose diameter $A_2$ is larger than the inside diameter $I_2$ of the support ring 7 at its largest point.

The outside surfaces of the intermediate sections 26, likewise, lie on a common cylindrical surface whose diameter $A_3$ is smaller than the inside diameter $I_2$ of the support ring 7 at its smallest point. The width $B_3$ of the sections 26, moreover, is larger than the width $B_2$ of the support ring 7.

The front pieces 25 of the extensions 22 are designed as barbs. More specifically, the outside surfaces of these pieces lie on a common shell surface whose diameter $A_4$ is larger than the diameter $A_3$ and increases in extent in going from the end face 24 toward the intermediate sections 26. At its maximum extent, the diameter $A_4$ is somewhat larger than the inside diameter $I_2$ of the support ring 7 at its minimum extent. The width $B_4$ of the front pieces 25 is, advantageously, at most equal to the sum of the widths $B_1$ and $B_2$ of the connecting bridge 18 and the support ring 7 minus the width $B_3$ of the intermediate sections 26.

FIG. 2 shows a top view onto four extensions 22 of the support element of FIG. 1. As shown, the extensions 22 are of equal size and are separated by slots 30 to 33 of equal width $B_3$, the extensions and slots being generated, for instance, by milling out a suitable tubular body which is attached to the supporting ring 2 so as to be concentric with the axis 10 of the support element. As shown, the slots are arranged in diametrically opposing pairs, each pair having their common cutting plane along the axis 10 and through the latter. Moreover, as shown, the pairs of slots are displaced 90° on the circumferential direction relative to each other.

In the perspective view of FIG. 3, looking toward the front end face of the support element of FIGS. 1 and 2, the location of the four similar extensions 22 is illustrated in further detail. As can be seen, the extensions are attached in shoe-fashion to the support ring 2 of the structure 20. The extensions 22 each comprise a barb-like front piece 25, an intermediate section 26 and a spacer piece 27 and are separated by four equal slots, of which only the slot 30 is specifically designated. The slots are displaced 90° in the circumferential direction relative to each other and extend, advantageously, from the end face of the front pieces 25 to the first support ring 2 of the structure 20. This ensures sufficient elasticity of the extensions 22 in the radial direction.

In FIG. 3 can also be seen the gimbal-like displacement of the connecting bridges connecting consecutive pairs of support rings. Thus, the connecting bridge 12 between the support rings 2 and 3 is displaced 90° in the circumferential direction relative to the bridge 13 connecting the rings 3 and 4.

As can be appreciated, with support elements as shown in FIG. 1, support bodies of any desired length can be formed by pushing the free end 21 of a first support element over the extensions 22 of a second support element. In joining together these two support elements, the extensions 22 of the second element are bent elastically toward their common axis so as to permit the support ring 7 of the first element at its free end 21 to slide over the front barb pieces 25 of the second element. Thereafter, the extensions 22 return to their original position, and the support ring 7 of the first support element, which ring has been pushed over the front pieces 25, can now move only along the intermediate sections 26 of the second element. This is so because, as above described, the inside diameter $I_2$ of the ring 1 at its largest point or extent is always smaller than the diameter $A_4$ of the common outside surface of the front pieces 25 at their maximum extent and also is always smaller than the diameter $A_2$ of the common cylinder surface of the spacer sections 27. Furthermore, the inside diameter $I_2$ of the support ring 7 at its smallest point or extent is at most equal to the diameter $A_3$ of the common cylinder surface of the intermediate sections 26. This permits easy sliding of the support ring 7 of the first element on the intermediate sections 26 of the second element.

As is apparent, the conical shape of the common outside surface of the barb-like front pieces 25 and the corresponding chamfer of the inside surface of the support ring 7 facilitates the joining of the first and second support elements when the former is pushed over the latter. Also, the barb-like shape of the front pieces 25 prevents loosening of the established connection between the two support elements. Advantageously, moreover, the play between the two support elements which is brought about by the predetermined oversize of the width $B_3$ of the intermediate sections 26 relative to the width $B_2$ of the support ring 7 can be made so that thermal contraction is completely taken up when cooling down to a low temperature.

While the dimensions of a support element in accordance with the present invention depends upon the particular application, a typical support element might have dimensions as follows:

| | |
|---|---|
| outside diameter $A_1$ = 58mm | length intermediate sections 26 = 15mm |
| outside width $B_1$ = 10mm | length spacing sections 27 = 9mm |
| outside width $B_2$ = 10mm | length diameter $A_4$(min) = 48mm |
| inside diameter $I_1$ = 38mm | length diameter $A_5$(max) = 52mm |
| inside diameter $I_2$(min) = 46mm | length diameter $A_3$ = 46mm |
| inside diameter $I_2$ (max) = 50mm | length diameter $A_2$ = 56mm |
| length front pieces 25 = 5mm | length width $B_6$ = 16mm |

A conductor of flexible design as, for instance, a conductor comprised of superconducting wires or ribbons, when placed on support bodies formed from support elements in accord with the invention, retains its constant length regardless of temperature changes, if the wires or ribbons of the conductor placed on the cylindrical support body in a single layer have a pitch angle relative to the axis 10 of $$0 = \text{arc sin } \sqrt{\alpha L/\alpha S}$$

where $\alpha L$ and $\alpha S$ are the coefficients of expansion of the conductors and the support elements. In order not to limit the transport current in the conductor, the pitch angle of the conductor wires and, therefore, the ratio of the coefficients of expansion should, advantageously, be chosen as large as possible. For this reason, in actual practice, plastics can be advantageously used for the support elements, since the coefficient of expansion of plastics is about an order of magnitude greater than that of metals. Additionally, designing the support body in accordance with the invention, ensures that the support body contracts in the radial direction, while it retains its constant length in the axial direction, during cooling down.

The coefficient of expansion of the support body or the support elements can, furthermore, be advantageously selected in such a way that it approximately agrees with that of the electrical insulation which is arranged around the individual conductors being supported and which may be comprised mainly of wrapped plastic tape. For cost reasons or also because of its good electrical or mechanical properties at low temperatures, polyethylene, for instance, may be used for the electrical insulation. Polyethylene, for instance, high density polyethylene, that has sufficient mechanical strength and can be processed simply and inexpensively may also be used for the support body.

In the illustrative embodiment discussed above, six support rings are combined, via connecting bridges, to form an axial, rigid support element. For manufacturing and cost reasons, a fewer number of support rings, numbering at least two or more, may also be used to form the support element.

What is claimed is:

1. In an electrical cable to be operated at low temperatures, an improved support body comprising:
   a plurality of support elements arranged one behind the other along a given axis, each of said support elements including:
   at least two support rings which enclose said axis and are arranged at predetermined spacings, one behind the other;
   bridge members arranged parallel to said axis for rigidly connecting said support rings; and
   at least one extension connected to the first one of said rings for engaging the last ring of the preceeding support element, said extension includ-
   ing means for limiting the degree with which said preceeding element can slide apart from the first one of said rings when said preceeding element is engaged by said extension.

2. Apparatus in accordance with claim 1 in which said extension is such that said last ring can be pushed thereover for engagement therewith.

3. Apparatus in accordance with claim 1 in which: each of said support elements includes at least three support rings; and the bridge members included in each support element are divided into a first group of bridge members which connect the first and second rings of their respective element and a second group of bridge members which connect the second and third rings of their respective element, each of said first group of bridge members being displaced in the circumferential direction in gimbal-fashion from its corresponding second group of bridge members.

4. Apparatus in accordance with claim 1 in which the last of said rings included in each support element has an inside diameter which increases when moving in a direction away from the support ring preceding said last of said rings in that element.

5. Apparatus in accordance with claim 1 in which each support element comprises a plurality of extensions which are separated from each other by slots and which form parts of an annular body, said plurality of extensions of each support element being connected to the first support ring included in that element.

6. Apparatus in accordance with claim 5 in which the extensions included in each support element comprise front portions designed in the form of barbs, said front portions having outside surfaces which lie on a common shell surface whose diameter is at least in part larger than the minimum inside diameter of the last support ring included in the support element comprising the front portions.

7. Apparatus in accordance with claim 6 in which said diameter of the common shell of each of said support elements decreases in the direction away from the first support ring of that element.

8. Apparatus in accordance with claim 6 in which the extensions included in each of said elements are elastic and can be bent at their respective front pieces toward said axis.

9. Apparatus in accordance with claim 6 in which the extensions included in each support element comprise intermediate sections connected between the front pieces included in the extensions and the respective first ring to which the extensions are connected, said intermediate sections having outside surfaces which lie on a common cylindrical surface whose diameter is at most equal to the minimum inside diameter of the last support ring included in the support element comprising the intermediate sections and whose width is larger than the corresponding width of that last support ring.

10. Apparatus in accordance with claim 9 in which the difference between the width of each cylindrical surface and the last supporting ring corresponding to that cylindrical surface is matched to the thermal contraction of the associated section of said cable.

11. Apparatus in accordance with claim 9 in which the extensions included in each support element comprise spacing sections connected between the intermediate sections included in the extensions and the respective first ring to which the extensions are connected, said spacing sections having outside surfaces which lie on a common cylindrical surface whose diameter is larger than the maximum inside diameter of the last support ring included in the support element comprising the spacing sections.

12. Apparatus in accordance with claim 1 in which each of said support elements comprise plastic material.

13. Apparatus in accordance with claim 1 in which each of said support elements comprise a high density polyethylene material.

* * * * *